April 2, 1946.  H. TAYLOR  2,397,889
FASTENING DEVICE
Filed May 31, 1943  2 Sheets-Sheet 1
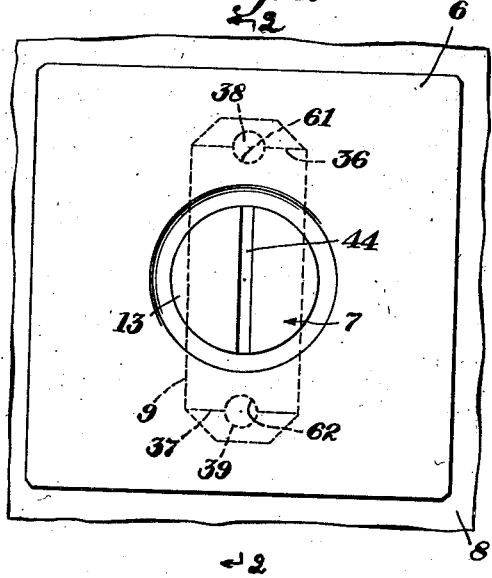
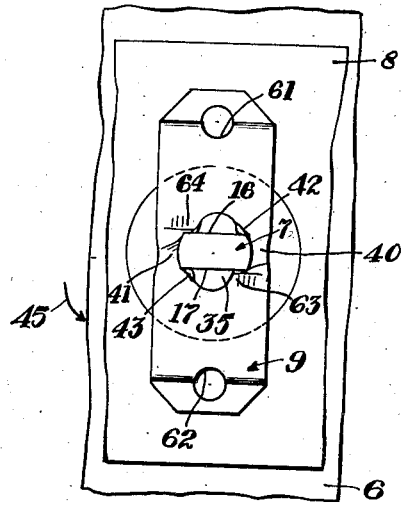
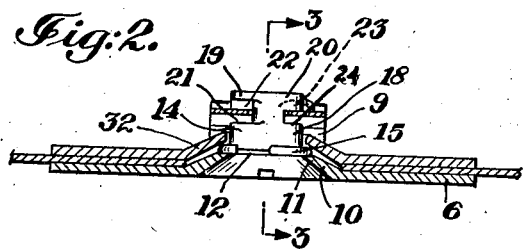
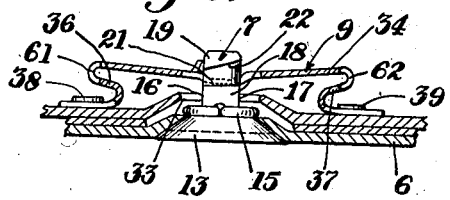
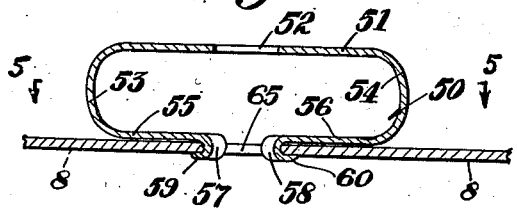
INVENTOR:
Harry Taylor
BY
ATTORNEYS.

April 2, 1946.                H. TAYLOR                2,397,889
                           FASTENING DEVICE
                         Filed May 31, 1943            2 Sheets-Sheet 2
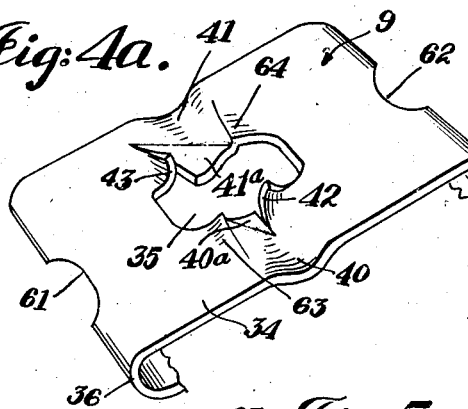
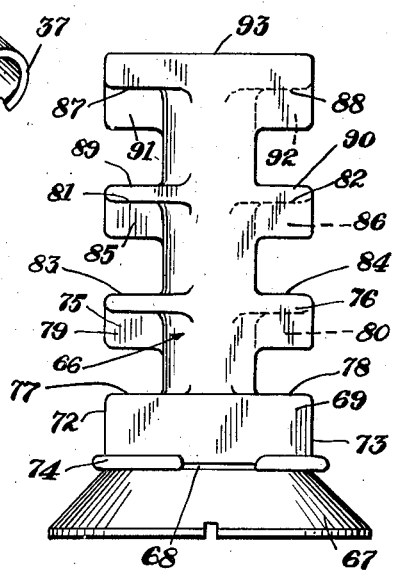
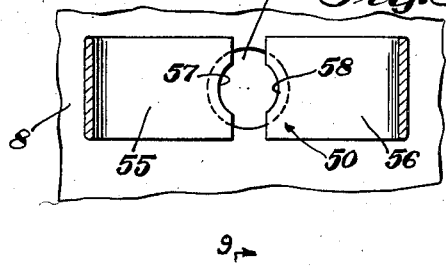
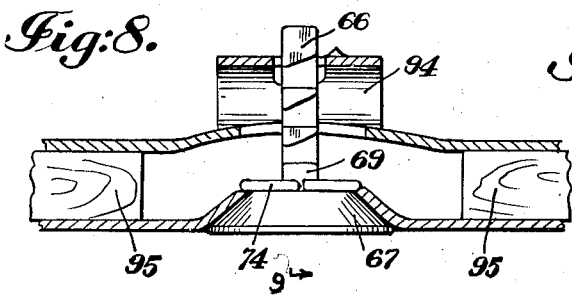
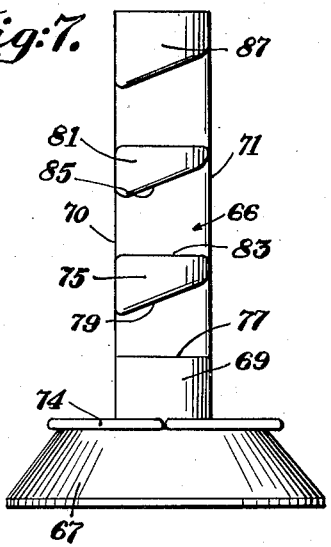
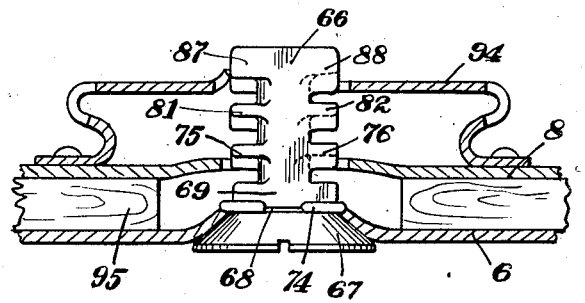
INVENTOR.
Harry Taylor
BY Richard y Geier
ATTORNEYS.

Patented Apr. 2, 1946

2,397,889

UNITED STATES PATENT OFFICE 2,397,889

FASTENING DEVICE

Harry Taylor, West Babylon, N. Y.

Application May 31, 1943, Serial No. 489,172

1 Claim. (Cl. 24—221)

This invention relates to a locking or fastening device and refers more particularly to a device for attaching covers or panels of sheet metal or the like.

An object of the present invention is the provision of a fastener or closure device which can be conveniently used for panels having varying thicknesses or extending at different distances from each other.

Another object of the present invention is the provision of a closure device of this type which may be inexpensively manufactured, which is sturdy in construction, and durable in operation, which will not weaken the structure and which will not protrude to any appreciable extent so as to cause air resistance whenever the device is used in connection with an airplane, automobile body or other movable mechanism.

Other objects of the present invention will become apparent in the course of the following specification.

In accomplishing the objects of the present invention it was found desirable to provide a leaf spring or similar resilient member which is attached to one of the plates and which is provided with suitable stops and depressed or inclined portions adapted to receive certain surfaces of a key which extend through openings provided in the spring and in the two plates. The key has one or more locking portions provided with the locking surfaces. The locking portions may be located one over the other so that any one of the surfaces can be used to lock the two plates, depending upon the thicknesses thereof or their operative distances one from the other.

The invention will appear more clearly from the following detailed description when taken in connection with the accompanying drawings, showing, by way of example, preferred embodiments of the inventive idea.

In the drawings:

Figure 1 is a front view of a locking device constructed in accordance with the principles of the present invention, somewhat larger than the actual size, showing the cover plate and the base plate latched together.

Figure 2 is a section along the line 2—2 of Figure 1, and shows the key in the position in which it is about to be turned to lock the device.

Figure 3 is a section along the line 3—3 of Figure 2.

Figure 4 is a rear view illustrating the key in a locked position.

Figure 4a is a detailed view showing the locking spring.

Figure 5 is a diagram illustrating a locking device having a leaf spring of a somewhat different form.

Figure 5a is a section along the line 5—5 of Figure 5.

Figure 6 is a front view of a different key.

Figure 7 is a side view of the key shown in Figure 6.

Figure 8 shows in section a locking device wherein the key shown in Figures 6 and 7 is used.

Figure 9 is a section along the line 9—9 of Figure 8.

The device shown in Figures 1 to 4a of the drawings includes a cover plate 6, carrying a key 7, while the base plate 8 carries a latching leaf spring 9.

The cover plate 6 is dimpled or bent inwardly as indicated at 10, and is provided with a central opening 11 which contains an intermediate portion 12 of the key 7.

The portion 12 of the key is located between the head 13, and the shank 14 of the key. The head 13 has conical surfaces fitting into the depressed portion of the plate 6 so that the head 13 does not project beyond the outer surface of the plate 6. The portion 12 of the key is maintained within the opening 11 through the provision of a cotter pin 15 which extends through the key and which is provided with bent ends located over the edges of the opening 11. By these or other suitable means the key 7 is held firmly in the plate 6.

The shank 14 of the key 7 has the form of a comparatively elongated element, provided with longitudinal surfaces 16 and 17, which extend parallel to each other. In the example illustrated in Figures 2 and 3 the shank 13 has one set of locking surfaces situated between the inner body portion 18 of the shank, and projections 19 and 20, extending opposite each other. The projections 19 and 20 jointly constitute a locking bar perpendicular to the shank 18. The shank portion 18 has a surface 21 which may be substantially horizontal. On the other hand, the projection 19 has a lower surface 22 which is situated opposite the surface 21 and which is inclined toward the head 13 in the direction from the side surface 17 toward the side surface 16.

The opposite side of the key is similarly constructed. The projection 20 has an inner surface 23 which extends inwardly, namely, toward the head 13 in the direction from the side surface 16 toward the side surface 17. The inner shank portion 18 has a surface 24 which is located opposite the surface 23 and which extends substantially at right angles to the side surfaces 16 and 17.

The base plate 8 has an inwardly bent portion 32, adapted to receive the portion 10 of the cover plate 6. The plate 8 has an opening 33 which is located substantially in alignment with the opening 11 of the plate 6. The shank 14 of the key 7 is adapted to extend through the opening 33 of the plate 8.

The latching spring 9 includes the main portion 34, provided with a central opening 35 through which the key 7 extends. The spring includes two S-shaped supporting portions or legs 36 and 37 which are firmly riveted or otherwise connected to the plate 8 at 38 and 39, respectively. The legs 36 and 37 are provided with semi-circular recesses 61 and 62, respectively, which facilitate the riveting operation.

The opening 35 of the spring 9 may be somewhat elongated in form so as to adapt itself to the outline of key 13. Depressed portions 40 and 41 extend on opposite sides of the opening 35 and are adapted to receive the surfaces 22 and 23 respectively, of the key. The diagonal half portions 40a, 41a, containing the free-standing corners of depressed portions 40, 41, respectively, constitute separately functioning leaf springs formed out of the material of the spring 9.

A stop 42 is located close to the depressed portion 40, while a stop 43 is located close to the depressed portion 41. The stops 42 and 43 are formed of upwardly curved portions of the slitted edges enclosing the opening 35, and are resilient like portions 40a and 41a, and are adapted jointly with the latter to wedge the locking bar 19, 20, tightly in locked position, whereas in prior art the equivalent of the locking bar 19, 20, has merely rested in a depression which exhibited no wedging action.

An upwardly inclined portion 63 is situated on opposite side of the depression 40 from the stop 42. A similar upwardly inclined portion 64 is provided on the opposite side of the depression 41 from the stop 43. These inclined portions rise gradually from the level of the spring and have a sharp drop facing their depressions. This arrangement improves to a great extent the locking engagement of the device.

In operation, the key 7 is inserted into position as indicated in Figure 2 with the shank 14 extending through the openings 33 and 35. Then the key may be turned by the insertion of a tool in the slot 44, provided in the head 13. Due to the provision of the stops 42 and 43, the key may be turned only in one direction, namely, over the upwardly inclined portions and into the depressions. The direction of the locking movement of the key is indicated by the arrow 45 in Figure 4. This locking movement is terminated when the key strikes the projections 42 and 43 and assumes the position shown in Figure 4.

In the construction shown in Figures 5 and 5a, the above described spring has been substituted by a spring 50 which has an upper portion 51 provided with an opening 52 for the insertion of a key which may be similar to the key 7 and which is not shown in the drawings.

The spring 50 has two curved legs 53 and 54, terminating in portions 55 and 56 respectively, which extend parallel to the portion 51 and which may lie over the plate 8.

The spring 50 has two curved legs 57 and 58 which extend through the opening 65 of the plate, and which conform to the outline of the opening. The legs 57 and 58 have ends 59 and 60 bent over the edges of the opening 65. Due to the described arrangement, the spring 50 is firmly mounted upon the plate 8 without it being necessary to use any rivets or other means attaching the spring to the plate. In case of damage, the removal of the spring 50, and its substitution by a new spring, is considerably facilitated.

Figures 6 to 9 show a construction wherein a key 66 is provided with three sets of locking surfaces located one over the other, whereby any one set may be used for locking purposes. Thus the key 66 may be used to lock the plates 6 and 8 located at three different distances from each other.

The key 66 has a head 67 which is conical in form, and a shank having a substantially cylindrical portion 68 and an elongated portion 69 having flat parallel surfaces 70 and 71 and somewhat curved end surfaces 72 and 73. A cotter pin 74 extends through the key portions 68 and 69 and has ends bent over the portion 68 and maintaining the key firmly upon the plate 6.

Projections 75 and 76 extend on opposite sides of the shank above the portion 69. The first set of locking surfaces is located upon the portion 69 and the projections 75 and 76. These locking surfaces include comparatively flat surfaces 77 and 78 constituting a part of the portion 69 and extending substantially parallel to the plate 6. Surfaces 79 and 80 are situated opposite the surfaces 77 and 78 upon the projections 75 and 76, respectively. The surfaces 79 and 80 extend at acute angles to the surfaces 77 and 78.

The second set of locking surfaces is situated between projections 75 and 76, on the one hand, and projections 81 and 82 on the other hand. Projections 75 and 76 have surfaces 83 and 84 extending substantially parallel to the surfaces 77 and 78. Projections 81 and 82 have inclined surfaces 85 and 86 which may be parallel to the surfaces 79 and 80.

The third set of locking surfaces is located between projections 81 and 82, on the one hand, and the upper projections 87 and 88 on the other hand. These surfaces consist of surfaces 89 and 90 carried by the projections 81 and 82, respectively, and inclined surfaces 91 and 92 upon the projections 87 and 88. A flat surface 93 constitutes the end surface of the key.

The spring 94 is substantially similar to the spring 9 in construction and operation and is attached in the same manner to the plate 8. However, in this construction the spring 9 has no raised portions similar to the raised portions 63 and 64 of the spring 9.

The spring 94 and the key 66 co-operate in the same manner to lock the plates 6 and 8; the distance between these plates may be determined by intermediate pieces 95.

It is apparent that the above illustrations are subject to wide variations and modifications within the scope of the appended claim.

What is claimed is:

In a fastening device, a latching spring having a main portion, said main portion being formed with a substantially central and elongated opening through which a key is adapted to extend, said main portion further being formed on either side of said opening with a depressed portion, an upwardly inclined portion adjacent one side of said depressed portion, said spring being provided with a slit extending inwardly from said opening and constituting the opposite side of said depressed portion, and an upwardly curved portion constituting a stop on the opposite side of said depressed portion from said upwardly inclined portion, said depressed portion comprising a diagonal half portion comprising a free-standing corner, said diagonal half portion and said upwardly curved portions each constituting separately functioning spring portions adapted jointly to wedge said locking bar in locked position.

HARRY TAYLOR.